July 31, 1928.  1,679,268
T. A. RIGNEY
SHOCK ABSORBER
Filed Jan. 19, 1927
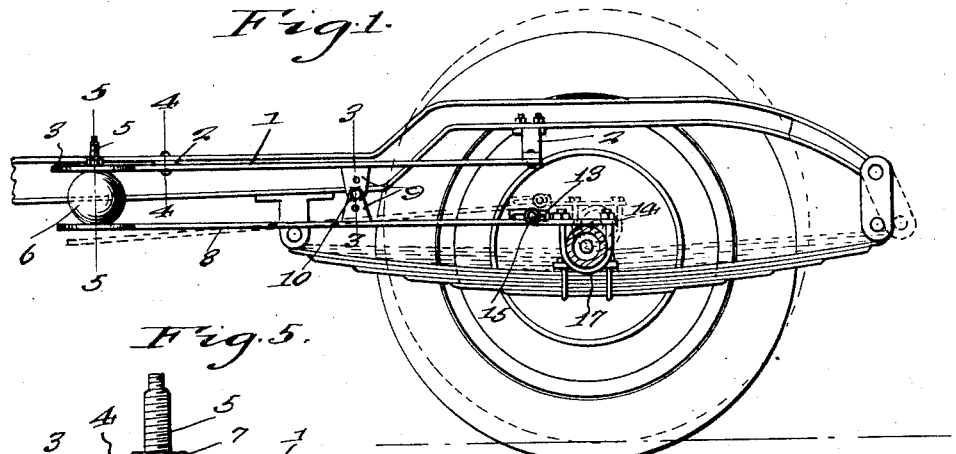
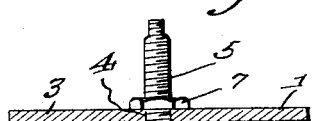
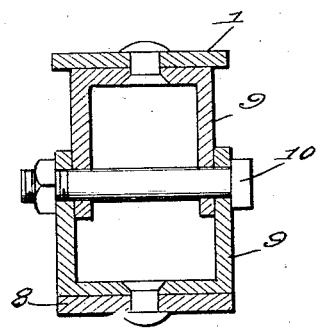
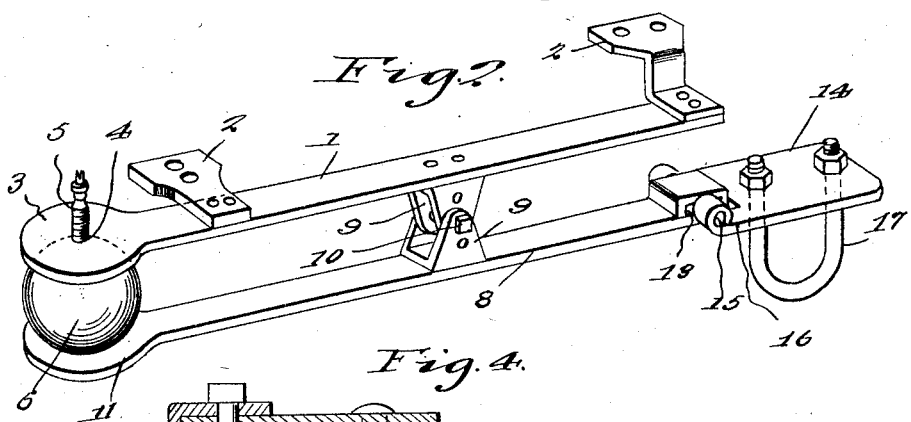
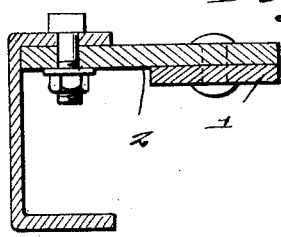
T. A. Rigney INVENTOR Patented July 31, 1928.

1,679,268

UNITED STATES PATENT OFFICE.

TOM A. RIGNEY, OF LAUREL, MONTANA.

SHOCK ABSORBER.

Application filed January 19, 1927. Serial No. 162,094.

This invention relates to shock absorbers, the general object of the invention being to provide pneumatic means for preventing the rebound of the springs of a vehicle being communicated to the body of the vehicle, the rebound movement being transmitted to the pneumatic means through means of a lever.

A further object of the invention is to make the pneumatic means in the form of a sphere formed of resilient material, with means for inflating the member when necessary.

A still further object of the invention is to provide a supporting member which is adapted to be fastened to a part of the vehicle and which carries the lever and the pneumatic member.

Another object of the invention is to provide means for movably connecting the lever with an axle so as to permit movement of the parts under the action of the spring without damaging the lever.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view showing a portion of a vehicle with my invention in use thereon.

Figure 2 is a perspective view of the parts forming the invention.

Figure 3 is a section on line 3—3 of Figure 1.

Figure 4 is a section on line 4—4 of Figure 1.

Figure 5 is a section on line 5—5 of Figure 1.

I may use one of these shock absorbing devices for each spring of a vehicle or two of these devices may be used for the rear springs or the front springs, as desired. Of course, the use of four of these devices would make the vehicle ride with most comfort.

The drawings show but one of the devices in use for one of the rear springs of the vehicle and in these drawings, 1 indicates a supporting bar which is connected with a part of the frame of the body of the vehicle by means of the brackets 2. The inner end of the bar 1 has a rounded enlargement 3 thereon which has a hole 4 therein through which a valve stem 5 of a sphere 6, formed of resilient material, extends. A nut 7 is placed on the stem and thus the stem fastens the sphere to the under side of the enlargement of the bar 1. A lever 8 is pivotally secured to the bar through means of the brackets 9 secured to the lever and bar and the pivot pin 10 which passes through holes in the overlapping portions of the brackets. I prefer to provide a number of these holes so that the lever can be adjusted relative to the bar.

This lever is also provided with an enlargement 11 at its inner end which is recessed, as at 12, to receive the lower portion of the sphere. The other end of the lever is formed with an elongated eye 13 which is preferably formed by bending over the end of the lever as shown. A plate 14 is hinged to the lever by means of a pin 15 which passes through the eye and through eyes formed by rolling the extensions 16 of the plate. This plate is adapted to be connected to the axle or the axle housing adjacent the spring by means of the U bolt 17.

From the foregoing it will be seen that on the rebound movement of the spring of a vehicle, the lever will be tilted on its pivotal point through means of the body moving away from the axle and this movement of the lever will cause its inner end to press upwardly against the sphere 6 and this pneumatic sphere will resist the movement of the lever and thus check the rebound movement and prevent it from being communicated to the body and to the occupants therein. By movably connecting the lever with the plate 14, movement of the parts under the action of the spring is permitted without injuring the lever, as will be understood.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A shock absorber for a vehicle comprising a supporting bar, means for connecting the bar to a part of the vehicle, a pneumatic sphere carried by one end of the supporting bar, a lever pivoted to the supporting bar and having one end engaging the sphere, the other end of the lever having an elongated eye formed thereon, a plate, a pivot pin carried by the plate and passing through the eye and means for fastening the plate to an axle of the vehicle.

In testimony whereof I affix my signature.

TOM A. RIGNEY.